(12) United States Patent
Wang (10) Patent No.: US 12,353,906 B2
(45) Date of Patent: Jul. 8, 2025

(54) DATA PROCESSING METHOD AND APPARATUS, ELECTRONIC DEVICE, AND SYSTEM

(71) Applicant: STRAITDEER PTE. LTD., Singapore (SG)

(72) Inventor: Shaohua Wang, Singapore (SG)

(73) Assignee: STRAITDEER PTE. LTD., Singapore (SG)

( * ) Notice: Subject to any disclaimer, the term of this patent is extended or adjusted under 35 U.S.C. 154(b) by 454 days.

(21) Appl. No.: 17/966,240

(22) Filed: Oct. 14, 2022

(65) Prior Publication Data

US 2023/0035565 A1 Feb. 2, 2023

Related U.S. Application Data (63) Continuation of application No. PCT/CN2020/084990, filed on Apr. 15, 2020.

(51) Int. Cl.
*G06F 9/48* (2006.01)

(52) U.S. Cl.
CPC ..................................... *G06F 9/48* (2013.01)

(58) Field of Classification Search
None
See application file for complete search history.

(56) References Cited

U.S. PATENT DOCUMENTS

| | | | |
|---|---|---|---|
| 8,307,367 B2 | 11/2012 | Ahuja et al. | |
| 2003/0191795 A1 | 10/2003 | Bernardin et al. | |
| 2006/0195508 A1 | 8/2006 | Bernardin et al. | |
| 2008/0313345 A1 | 12/2008 | Bernardin et al. | |
| 2010/0229181 A1 | 9/2010 | Ahuja et al. | |
| 2014/0181828 A1 | 6/2014 | Bird et al. | |
| 2014/0201751 A1 | 7/2014 | Bird et al. | |

(Continued)

FOREIGN PATENT DOCUMENTS

| | | |
|---|---|---|
| CN | 102307133 A | 1/2012 |
| CN | 106951330 A | 7/2017 |
| CN | 107018175 A | 8/2017 |

OTHER PUBLICATIONS

Examination report dated Sep. 17, 2024 received in European Patent Application No. 20930959.0.

(Continued)

*Primary Examiner* — Craig C Dorais
(74) *Attorney, Agent, or Firm* — Scully, Scott, Murphy & Presser, P.C.

(57) ABSTRACT

Provided are a data processing method and apparatus, an electronic device, and a system. The data processing method comprises: determining a target service object; according to the correspondence among a service object, a service time period and a service platform, determining a target service time period and a target service platform for providing data processing for the target service object; and controlling a data processing device to perform data processing for the target service object within the target service time period and on the basis of the target service platform. Controlling a data processing device by means of the correspondence can not only improve user experience, but also facilitates the reasonable planning of the processing capacity of the data processing device, and correspondingly, can improve data processing efficiency.

16 Claims, 4 Drawing Sheets

(56) References Cited

U.S. PATENT DOCUMENTS

| | | | |
|---|---|---|---|
| 2016/0292191 A1* | 10/2016 | Mori | G06F 11/16 |
| 2018/0120925 A1* | 5/2018 | Takahashi | G06F 1/3206 |
| 2019/0205164 A1 | 7/2019 | Kumar et al. | |
| 2020/0012523 A1 | 1/2020 | Kumar et al. | |
| 2021/0064573 A1* | 3/2021 | Rao | G06F 16/128 |

OTHER PUBLICATIONS

Panagiotis Chatzigiannis et al., "Diversification Across Mining Pools: Optimal Mining Strategies under PoW", XP081370961, arxiv.org, Cornell University Library, 201 Olin Library Cornell University Ithaca, NY 14853, May 12, 2019, p. 1-13.

International Search Report dated Jan. 21, 2021 issued in PCT/CN2020/084990.

* cited by examiner

DATA PROCESSING METHOD AND APPARATUS, ELECTRONIC DEVICE, AND SYSTEM

CROSS-REFERENCE TO RELATED APPLICATIONS

This application is a continuation of International Application No. PCT/CN2020/084990, filed on Apr. 15, 2020, the disclosure of which is hereby incorporated by reference in its entirety.

TECHNICAL FIELD

The present application relates to the field of data processing, and in particular, to a method, apparatus, electronic device and system for data processing.

BACKGROUND

At present, an entire data processing device needs to be connected to a service platform when performing a data processing. When the data processing needs to be performed for different service objects or on different service platforms, it needs to be reconfigured, so efficiency is relatively low and user experience is relatively poor.

In conclusion, there is an urgent need for a data processing method that may improve the efficiency of data processing.

SUMMARY

The application provides a method, apparatus, electronic device and system for data processing, which may improve user experience.

In a first aspect, a method for data processing is provided, including:
  determining a target service object;
  determining a target service time period and a target service platform for providing the target service object with data processing service according to the correspondence among service object, service time period and service platform; and
  controlling a data processing device to perform the data processing for the target service object within the target service time period and on the basis of the target service platform.

In view of the above technical solution, by associating (one or more) service objects with (one or more) service time periods and (one or more) service platforms respectively, it is possible to control a data processing device to perform the data processing for different service objects within their corresponding service time periods and on the basis of their corresponding service platforms. This is equivalent to, the data processing device in different service time periods may perform the data processing on different service platforms, or the data processing device in different service time periods may perform the data processing for different service objects. Compared with a scheme of switching the service platform/service object only by reconfiguring configuration information of the data processing device, it may not only improve user experience, but also facilitate a reasonable planning of a processing capacity of the data processing device, and accordingly, may improve data processing efficiency.

In some possible implementation manners, the correspondence is established according to the following methods:

determining the service platform corresponding to each service object in at least one service object;
  determining the service time period corresponding to the each service object; and
  establishing the correspondence according to the service platform corresponding to the each service object and the service time period corresponding to the each service object.

In some possible implementation manners, determining the service time period corresponding to the each service object includes:
  determining a first data processing capacity required by the each service object;
  determining a second data processing capacity that the data processing device may provide within one operating cycle; and
  determining the service time period corresponding to the each service object according to the first data processing capacity required by the each service object, the second data processing capacity and the operating cycle.

In some possible implementation manners, determining the service time period corresponding to the each service object according to the first data processing capacity required by the each service object, the second data processing capacity and the operating cycle includes:
  determining the service time period corresponding to the each service object according to the following formula:

$Ti=(Hi/H)*T;$ wherein, the Ti represents the service time period corresponding to the $i^{th}$ service object in the at least one service object, the Hi represents the first data processing capacity required by the $i^{th}$ service object, the H represents the second data processing capacity, and the T represents the operating cycle.

In some possible implementation manners, determining a second data processing capacity that the data processing device may provide within one operating cycle includes:
  determining an average data processing capacity of the data processing device within a historical time period; and
  using the average data processing capacity as the second data processing capacity.

In some possible implementation manners, the method further includes:
  if it is determined that a sum of the service time periods corresponding to the at least one service object is less than or equal to the operating cycle, the data processing device will be controlled to perform the data processing for the initial service object within a remaining time period and on the basis of the initial service platform;
  wherein, the remaining time period is the time period of the operation cycle minus the service time period corresponding to all service objects.

By controlling the data processing device to perform the data processing for an initial service object within a remaining time period and on the basis of an initial service platform, it is equivalent to when a working state of the data processing device is in an unsaturated state, a remaining processing capacity is provided to the initial service object by controlling the data processing device to maximize the utilization of resource.

In some possible implementation manners, the data processing device includes at least one data processing unit, and each data processing unit includes at least one data processing chip.

In some possible implementation manners, the data processing chip can be a graphics processing unit (GPU), a central processing unit (CPU) or an application specific integrated circuit (ASIC) chip.

In some possible implementation manners, the method further includes:
monitoring an operating state of the each data processing unit; and
switching data to be processed by any data processing unit to other data processing units if the any data processing unit is determined to be faulty according to the operating state.

In other words, a faultless data processing unit in the data processing device is used to undertake the data to be processed of the faulty data processing unit, that is, the faulty data processing unit is replaced with the faultless data processing unit to realize data processing, which may not only ensure a timely processing of the data to be processed, but also ensure the stability of the data processing, and improve the processing efficiency and user experience of the data.

In some possible implementation manners, the any data processing unit is determined to be faulty includes:
determining that the any data processing unit is faulty if a difference value between a third data processing capacity and a fourth data processing capacity of the any data processing unit is greater than or equal to a set threshold value; wherein, the third data processing capacity is a current data processing capacity of the any data processing unit; and the fourth data processing capacity is a maximum data processing capacity that the data processing unit may provide within the operating cycle.

In some possible implementation manners, the service object is a user, the service platform is a proof-of-work hashrate collection platform, and the data processing unit in the data processing device is the proof-of-work computing device.

In a second aspect, a data processing apparatus is provided, including:
a determining unit, the determining unit being configured to:
determine a target service object;
determine a target service time period and a target service platform for
providing the target service object with the data processing service according to the correspondence among service object, service time period and service platform; and
a controlling unit being configured to control a data processing device to perform the data processing for the target service object within the target service time period and on the basis of the target service platform.

In some possible implementation manners, the determining unit is further configured to:
establish the correspondence according to the following methods:
determining the service platform corresponding to each service object in at least one service object;
determining the service time period corresponding to the each service object; and
establishing the correspondence according to the service platform corresponding to the each service object and the service time period corresponding to the each service object.

In some possible implementation manners, the determining unit is specifically configured to:

determine a first data processing capacity required by the each service object;
determine a second data processing capacity that the data processing device may provide within one operating cycle; and
determine the service time period corresponding to the each service object according to the first data processing capacity, the second data processing capacity and the operating cycle.

In some possible implementation manners, the determining unit is more specifically configured to:
determine the service time period corresponding to the each service object according to the following formula:

$$Ti=(Hi/H)*T;$$

wherein the Ti represents the service time period corresponding to the $i^{th}$ service object in the at least one service object, the Hi represents the first data processing capacity required by the $i^{th}$ service object, the H represents the second data processing capacity, and the T represents the operating cycle.

In some possible implementation manners, the determining unit is more specifically configured to:
determine an average data processing capacity of the data processing device within a historical time period; and
using the average data processing capacity as the second data processing capacity.

In some possible implementation manners, the controlling unit is further configured to:
if it is determined that a sum of the service time periods corresponding to the at least one service object is less than or equal to the operating cycle, the data processing device will be controlled to perform the data processing for the initial service object within a remaining time period and on the basis of the initial service platform; wherein, the remaining time period is the time period of the operation cycle minus the service time period corresponding to all service objects.

In some possible implementation manners, the data processing device includes at least one data processing unit, and each data processing unit includes at least one data processing chip.

In some possible implementation manners, the data processing chip can be a graphics processing unit (GPU), a central processing unit (CPU) or an application specific integrated circuit (ASIC) chip.

In some possible implementation manners, the processing unit is further configured to:
monitor an operating state of the each data processing unit; and
switch data to be processed by any data processing unit to other data processing units if the any data processing unit is determined to be faulty according to the operating state.

In some possible implementation manners, the processing unit is specifically configured to:
determine that the any data processing unit is faulty if a difference value between a third data processing capacity and a fourth data processing capacity of the any data processing unit is greater than or equal to a set threshold value; where the third data processing capacity is a current data processing capacity of the any data processing unit; and the fourth data processing capacity is a maximum data processing capacity that the data processing unit may provide within the operating cycle.

In some possible implementation manners, the service object is a user, the service platform is a proof-of-work hashrate collection platform, and the data processing unit in the data processing device is the proof-of-work computing device. In a third aspect, an electronic device is provided, including:

a processor and a memory, the memory being configured to store a computer program, and the processor being configured to call and run the computer program stored in the memory to execute the method described in the first aspect or any possible implementation of the first aspect.

In a fourth aspect, a system for data processing is provided, including a data processing device, a data processing apparatus and at least one service platform, the data processing device being connected to the at least one service platform through the data processing apparatus; wherein, the data processing apparatus is configured to control the data processing device to execute the method described in the first aspect or any possible implementation manner of the first aspect.

BRIEF DESCRIPTION OF DRAWINGS

One or more embodiments are exemplarily described by corresponding accompanying drawings, and these exemplary illustrations and the accompanying drawings constitute no limitation on the embodiments. Elements with the same reference numerals in the accompanying drawings are similar elements, and the drawings are not limiting to scale, and where.

DESCRIPTION OF EMBODIMENTS

Technical solutions in embodiments of the present application will be described hereinafter with reference to the accompanying drawings in the embodiments of the present application.

Figure 1:
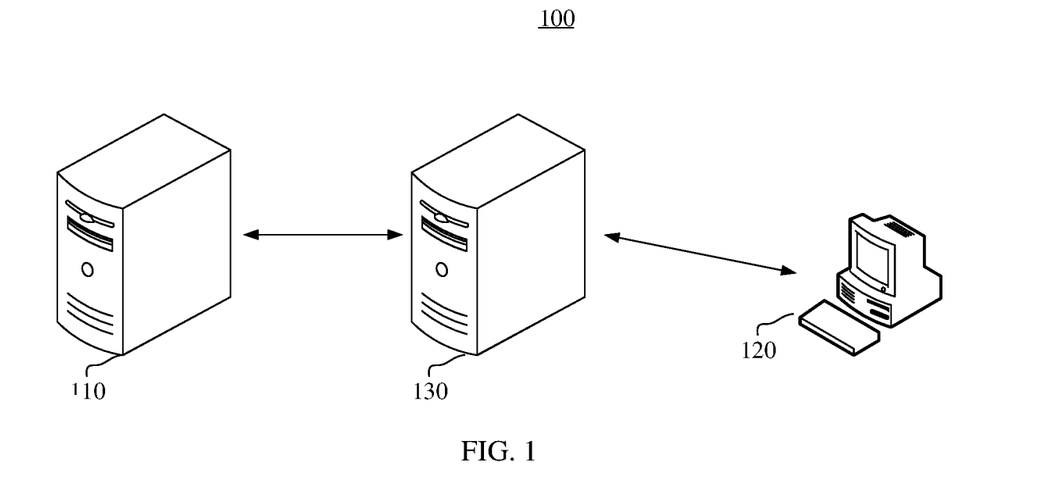
FIG. 1 is a schematic block diagram of a data processing system according to an embodiment of the present application.

FIG. 1 is a schematic block diagram of a data processing system 100 applicable to the present application.

The data processing system 100 may include a service platform 110, a data processing device 120, and a scheduling platform 130, the service platform 110, the data processing device 120, and the scheduling platform 130 may usually be connected by wire, such as a gigabit fiber, and the like. Certainly, the service platform 110, the data processing device 120, and the scheduling platform 130 may also be connected wirelessly, such as Wi-Fi, and the like, which is not limited in this embodiment. In some possible embodiments, the data processing system 100 may be a digital authentication processing system, an encryption algorithm processing system, an encrypted currency computing system, a hashrate providing system or a virtual currency mining system, and the like. Optionally, the service platform 110 may be a digital authentication platform, an encryption algorithm processing platform, an encrypted currency computing platform, a proof-of-work hashrate collection platform (also may be referred to as a hashrate providing platform) or a virtual currency mining platform; and a scheduling platform 130 may be a digital authentication scheduling platform, an encryption algorithm scheduling platform, an encrypted currency scheduling platform, a hashrate scheduling platform or a virtual currency scheduling platform, and the like, which will not be repeated here.

In some possible embodiments, a data processing device 120 may include at least one data processing unit (not shown in FIG. 1), that is, the data processing device 120 may be a single data processing unit or a cluster of more than two data processing units.

For example, the data processing device 120 may include a plurality of data processing units, the plurality of data processing units may be divided into at least one group of data processing units. In one scenario, the scheduling platform 130 may include at least one scheduling sub-platform, and the at least one scheduling sub-platform may be respectively configured to establish a connection with the at least one group of data processing units. Alternatively, the same scheduling platform may also establish a connection with a plurality of groups of data processing units, which is not limited.

In some possible embodiments, the data processing unit may be any device capable of realizing data processing, that is, any device having a central processing unit (CPU) or a graphics processing unit (GPU), such as a supercomputing device, a proof-of-work computing device, a proof-of-work supercomputing device, a proof-of-work cloud computing server, a digital authentication computing device, an encryption algorithm computing device, a cryptocurrency excavating device, a hashrate supply device or a virtual currency mining device, and the like, which will not be repeated here, either.

In some possible embodiments, when the data processing system 100 is the virtual currency mining system, the service platform 110 may be a single mining pool or a mining pool cluster in the virtual currency mining system, and the data processing device 120 may be a single mining machine (the virtual currency mining device) or a mining machine cluster in a virtual currency processing system; and when the data processing system 100 is the encryption algorithm processing system, the service platform 110 may be a single server or a server cluster in the virtual currency mining system, and the data processing device 120 may be a single encryption computer or an encryption computer cluster in the encryption algorithm processing system.

Specifically, the scheduling platform 130 may access the service platform 110 to obtain data to be processed from the service platform 110, for example, virtual currency mining job, and the like, and then the data to be processed is allocated to one or more data processing units in the data processing device. After the data processing unit finishing the processing, a processing result may be fed back to the scheduling platform 130 for verification by the scheduling platform 130, after verification and passing, the scheduling platform 130 may send the processing result to the service platform 110, and the service platform 110 may confirm whether the processing result is correct. This is equivalent to that the service platform 110 may utilize the processing capacity of one or more of the plurality of data processing units to complete data processing.

It should be understood that the data processing system 100 is only an example applicable to the present application, and the data processing system applicable to the present application is not limited thereto.

The application provides a data processing method, an apparatus, an electronic device and a system, which may improve the processing efficiency and user experience of the data.

Figure 2:
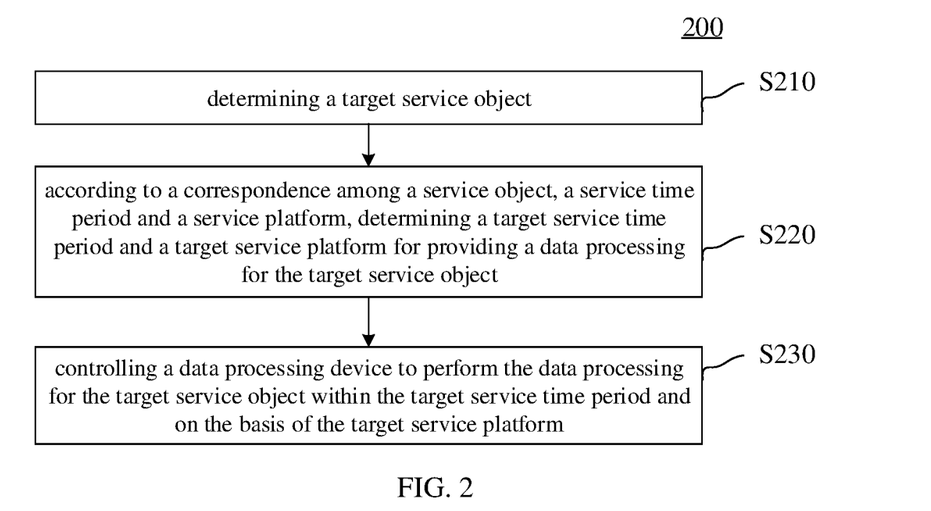
FIG. 2 and FIG. 3 are schematic flow charts of a data processing method according to an embodiment of the present application.

FIG. 2 is a schematic flowchart of a data processing method 200 according to an embodiment of the present application.

It should be understood that an execution body of the data processing method 200 may generally be the scheduling platform 130 shown in FIG. 1, where the scheduling platform 130 may be provided independently of the service platform 110 and the data processing device 120 as a whole, or may be provided in the service platform 110 or in the data processing device 120. Certainly, the data processing method 200 may also be executed by any apparatus and device with the data processing capacity.

In some possible embodiments, the data processing method 200 may also be executed by a software module or a computer program. In other possible implementation manners, the data processing method 200 may also be executed by a hardware module composed of a logic circuit. Furthermore, the data processing method 200 may also be executed by a physical device or a processor on which a software module is installed. For convenience of description, the data processing method 200 executed by the scheduling platform 130 is taken as an example for description below, and the scheduling platform 130 may be the data processing apparatus described hereinafter.

In some other embodiments, for one service object, when it is provided with the data processing capacity, it may be provided by one data processing unit, or may be further provided by more than two data processing units, which will not be repeated here.

As shown in FIG. 2, the data processing method 200 may include the following steps:

S210, determining a target service object.

S220, according to a correspondence among a service object, a service time period and a service platform, determining a target service time period and a target service platform for providing a data processing for the target service object.

S230, controlling a data processing device to perform the data processing for the target service object within the target service time period and on the basis of the target service platform.

In some possible embodiments, the execution body of the above data processing method may be the aforementioned scheduling platform 130, and certainly, the execution body may also be any other software or hardware capable of implementing the data processing method, which is not limited.

For convenience of description, the following description will be made by taking the scheduling platform 130 as the execution body.

Specifically, the correspondence may include the service time period corresponding to each service object in the at least one service object and the service platform corresponding to each service object in the at least one service object, and the at least one service object includes the target service object. Based on this, after determining the target service object, the scheduling platform 130 may determine the target service platform corresponding to the target service object and the target service time period corresponding to the target service object through the correspondence, and then control the corresponding data processing unit (which may be one, several or all) in the data processing device to perform the data processing for the target service object on the basis of the target service platform within the target service time period (if there are the plurality of data processing units, the respective service time period of these data processing units may be flexibly provided according to the actual situation, such as the same or different).

Where the data processing device may be the data processing device 120 shown in FIG. 1, and the target service platform may be the service platform 110 shown in FIG. 1. In order to avoid repetition, the data processing process of the data processing device on the basis of the target service platform will not be repeated here. In addition, the target service object may be a user possessing all or part of the processing capacity of the data processing device, but it is not limited in the present application.

In view of the above technical solution, by associating (one or more) service objects with (one or more) service time periods and (one or more) service platforms respectively, it is possible to control a data processing device to perform the data processing for different service objects within their corresponding service time periods and on the basis of their corresponding service platforms. This is equivalent to, the data processing device in different service time periods may perform the data processing on different service platforms, or the data processing device in different service time periods may perform the data processing for different service objects. Compared with a scheme of switching the service platform/service object only by reconfiguring configuration information of the data processing device, it may not only improve user experience, but also facilitate a reasonable planning of a processing capacity of the data processing device, and accordingly, may improve data processing efficiency.

It should be noted that the target service object may correspond to at least one data processing unit in the data processing device.

For example, the target service object may correspond to the plurality of data processing units in the data processing device, and accordingly, the scheduling platform 130 may simultaneously control the plurality of data processing units in the data processing device, and in a plurality of target service time periods respectively corresponding to the plurality of data processing units, the data processing is performed for the target service object on the basis of the plurality of target service platforms respectively corresponding to the plurality data processing units. Optionally, the plurality of target service time periods may overlap partially or overlap completely, or may not overlap at all; optionally, the plurality of service platforms may be partially same or completely same, or completely different; and which is not specifically limited in the present application.

For example, assuming that the data processing unit is the mining machine, for a target user, if the hashrate required by the target user is less than a maximum hashrate of the mining machine, the mining machine may be used to provide the hashrate for the target user, and if the hashrate required by the target user is greater than the maximum hashrate of the mining machine, a plurality of mining machines may be used to provide the hashrate for the target user.

In some possible embodiments, the scheduling platform 130 may allocate at least one data processing unit and a target service time period corresponding to each data processing unit to the target service object according to actual needs. For example, the target service object may correspond to the plurality of data processing units, and the service time periods respectively corresponding to the plurality of data processing units are equal, so as to reduce the time of data processing as much as possible. For another example, the target service object may correspond to n data processing unit(s), and n−1 data processing unit(s) in the n data processing unit(s) correspond to n−1 operating cycle(s) respectively, so as to reduce the number of data processing units occupied by the target service object as much as possible, and accordingly, the utilization of the data processing unit may be improved. Optionally, n is an integer greater than 0.

In some embodiments of the present application, the correspondence may be established according to the following methods:

determining the service platform corresponding to each service object in at least one service object;

determining the service time period corresponding to the each service object; and establishing the correspondence according to the service platform corresponding to the each service object and the service time period corresponding to the each service object.

Specifically, the at least one service object may be the service object that the data processing device requires to serve, based on this, the scheduling platform 130 may first determine the at least one service object, and then the scheduling platform 130 may determine that each service object in the at least one service object requires to occupy the service time period (that is, the service time period corresponding to each service object in the at least one service object) of the corresponding data processing unit (which may be one, several or all) in the data processing device, and the service platform on which each service object in the at least one service object uses the data processing device to process data, and finally, the scheduling platform 130 may establish the correspondence on the basis of the service platform corresponding to each service object and the service time period corresponding to each service object.

It should be noted that the correspondence may be established in advance and stored in a corresponding storage unit of the scheduling platform 130, or may be established in real time, which is not limited.

Certainly, the correspondence may also be stored in the storage unit of other device (such as the data processing device) or platform (such as the service platform).

After the data processing system is started, the scheduling platform will acquire the correspondence actively or passively, which will not be repeated here, either.

In some possible embodiments, the correspondence may be shown in Table 1:

TABLE 1

Schematic diagram of the correspondence

| Service object | Service platform | Service time period |
|---|---|---|
| A | c | 0.7 minutes |
| B | d | 2.1 minutes |
| C | a | 0.7 minutes |
| D | g | 1.4 minutes |
| E | y | 2.1 minutes |

In some possible embodiments, when the data processing device 120 includes the plurality of data processing units, the corresponding data processing units may also be included in the correspondence, as shown in Table 2.

TABLE 2

Schematic diagram of the correspondence

| Service object | Service platform | Service time period | Data processing unit |
|---|---|---|---|
| A | c | 0.7 minutes | Ip0.0.0.1, Ip0.0.0.2 |
| B | d | 2.1 minutes | Ip0.0.4.1, Ip0.0.4.5 |
| C | a | 0.7 minutes | Ip2.7.0.1 |
| D | g | 1.4 minutes | Ip0.0.0.2, Ip0.0.0.5, Ip0.0.0.9 |
| E | y | 2.1 minutes | Ip0.0.8.1 |

It may be seen from Table 2 that a service object may correspond to one or more than two data processing units in a certain service time period of a service platform, so as to realize the high efficiency of data processing.

It should be noted that, if one service time period corresponds to the plurality of data processing units, a plurality of service sub-time periods corresponding to the plurality of data processing units may be the same, or may be different.

For example, as shown in Table 2, within a first service time period (0.7) of a service platform C, a service object A may correspond to data processing units with addresses of Ip0.0.0.1 and Ip0.0.0.2 respectively. At this time, the service time periods corresponding to the data processing units with addresses of Ip0.0.0.1 and Ip0.0.0.2 respectively may be the same, or may be different, which is not specifically limited in the present application. For example, the duration of the service time period of the data processing unit with the address Ip0.0.0.1 and the duration of the service time period of the data processing unit with the address of Ip0.0.0.2 may be equal or not be equal. For another example, a starting time point of the service time period of the data processing unit with the address of Ip0.0.0.1 within one operating cycle and a starting time point of the service time period of the data processing unit with the address of Ip0.0.0.2 within one operating cycle may be the same, or may be different, which is not specifically limited in this application.

In order to facilitate the introduction, the data processing process is introduced in detail with an example of only one data processing unit is included in the data processing device:

For example, in the process of the scheduling platform 130 determining the service time period corresponding to the each service object in at least one service object, the scheduling platform 130 may first determine the first data processing capacity required by each service object in at least one service object; then determine the second data processing capacity that the data processing device may provide in an operating cycle; and finally, the service time period corresponding to each service object may be determined according to the first data processing capacity, the second data processing capacity and the operating cycle.

Alternatively, the above correspondence may also include the first data processing capacity required by each service object in the at least one service object.

For example, the scheduling platform 130 may determine the service time period corresponding to each service object based on the following formula:

$$Ti=(Hi/H)*T \qquad \text{Formula 1;}$$

where the Ti represents the service time period corresponding to an $i^{th}$ service object in the at least one service object, the Hi represents the first data processing capacity required by the $i^{th}$ service object, the H represents the second data processing capacity, and the T represents the operating cycle.

Taking a second data processing capacity H of the data processing device as 14 T hash operations per second (Hash/s, H/s) as an example, that is, 14*10^12 H/s, assuming that the operating period T is 10 minutes, and the first data processing capacity H1 required by the first service object is 1 TH/s, at this time, in the operating cycle, the service time period corresponding to the first service object is: 1/14*10=0.7 minutes, that is, 42 seconds. The scheduling platform 130 controls the data processing device to process data for the first service object (that is, perform the data processing for the first service object within the 0.7 minutes), and in the next time service time period, the data processing is carried out for the following each service object, so as to realize a capacity division of the data processing device.

The following takes the correspondence shown in Table 3 as an example to describe the specific implementation of the processing device performing data processing for 5 different service objects on their respective service platforms in different service time periods.

TABLE 3

Schematic diagram of the correspondence

| Service object | Service platform | Service time period | Second data processing capacity |
|---|---|---|---|
| Service object 1 | Service platform 1 | 0.7 minutes | 1T |
| Service object 2 | Service platform 1 | 2.1 minutes | 3T |
| Service object 3 | Service platform 2 | 0.7 minutes | 1T |
| Service object 4 | Service platform 3 | 1.4 minutes | 2T |
| Service object 5 | Service platform 4 | 2.1 minutes | 3T |

As shown in Table 3, assuming that the second data processing capacity H of the data processing device is 14 T hash operations per second (Hash/s, H/s), and the above operating cycle T is 10 minutes, then the data processing device performs the data processing for a service object 1 based on a service platform 1 in the service time period of a first service time period (0.7 minutes), the data processing device performs the data processing for a service object 2 based on a service platform 1 in a second service time period (2.1 minutes), and the data processing device performs the data processing for a service object 3 based on a service platform 2 in a third service time period (0.7 minutes), the data processing device performs the data processing for a service object 4 based on a service platform 3 in a fourth service time period (1.4 minutes), and the data processing device performs the data processing for a service object 5 based on a service platform 4 in a fifth service time period (2.1 minutes).

Certainly, the scheduling platform 130 may also determine its corresponding service object and service platform based on the service time period, or determine its corresponding service object and service time period based on the service platform, and then establish the correspondence, which is not limited in the embodiment of the present application.

For example, taking the scheduling platform 130 determining its corresponding service object and service platform based on the service time period as an example, the scheduling platform 130 may first determine the service object corresponding to each service time period in the at least one service time period and the service platform corresponding to each service time period in the at least one service time period based on at least one service time period within the operating cycle, and then, the correspondence is established based on the service object corresponding to each service time period in the at least one service time period and the service platform corresponding to each service time period in the at least one service time period.

For another example, taking the scheduling platform 130 determining its corresponding service object and service time period based on the service platform as an example, the scheduling platform 130 may first determine at least one service platform connected to the data processing device, and then obtain the service time period corresponding to each service platform in the at least one service platform and the service object corresponding to each service platform in the at least one service platform. Finally, the correspondence may be established based on the service time period corresponding to each service platform in the at least one service platform and the service object corresponding to each service platform in the at least one service platform.

In other possible embodiments, if the plurality of data processing units provide a data processing service for the same service object at the same time, the service time period of each data processing unit may be determined by its own data processing capacity and a processing ratio between the plurality of data processing units. For example, the data processing capacity required by a service object A is 10 TH/s, and the data processing devices serving it are Y1, Y2, and Y3 respectively, and their data processing ratio is 5:3:2, and their respective data processing capabilities are 10 TH/s, 20 TH/s and 30 TH/s respectively. It may be seen that Y1, Y2 and Y3 need to provide 5th/s, 3th/s and 2th/s data processing capacity respectively, and the length of the service time period is ½ operating cycle, 3/20 operating cycle and ⅕ operating cycle respectively, and assuming that the operating cycle is the same herein, it will not be repeated here.

In some embodiments of the present application, in the process of the scheduling platform 130 determining the second data processing capacity that the data processing device may provide in one operating cycle, the scheduling platform 130 may first determine an average data processing capacity of the data processing device within a historical time period; and then, the average data processing capacity is used as the second data processing capacity.

For example, the scheduling platform 130 may first obtain the average data processing capacity of the data processing device in the historical time period from the service platform where the data processing device is located, and then determine the average data processing capacity as the second data processing capacity. When the data processing device is connected to the plurality of service platforms at the same time, in a specific implementation, the scheduling platform 130 may acquire the average data processing capacity from any one of the plurality of service platforms, and use the acquired average data processing capacity as the second data processing capacity directly, in another specific implementation, the scheduling platform 130 may first obtain a plurality of average data processing capacities from the plurality of service platforms, and then, an average value (which may also be a maximum value or a minimum value) of the plurality of average data processing capabilities is determined as the second data processing capacity.

In some embodiments of the present application, the method 200 may also include:

if it is determined that a sum of the service time periods corresponding to the above at least one service object is less than or equal to the operating cycle, the data processing device will be controlled to perform the data processing for an initial service object within a remaining time period and on the basis of an initial service platform; and where the remaining time period is a time period other than the service time period corresponding to all service objects subtracted in the operating cycle.

In some possible embodiments, the initial service object may be the owner of the corresponding data processing device, and the initial service platform may be the service platform selected by the owner.

In other words, when the scheduling platform 130 determines that the data processing device still has the remaining processing capacity, it may control the data processing device to provide the owner of the data processing device with data processing capacity on the service platform selected by the owner of the data processing device.

For example, the sum of the service time periods corresponding to all service objects serving the data processing device (duration 1+duration 2+ . . . +duration n) is less than one operating cycle of 10 minutes, the scheduling platform 130 may control the data processing device to provide data processing capacity for the initial service object based on the initial service platform in the remaining time.

By controlling the data processing device to perform the data processing for the initial service object within the remaining time period and on the basis of the initial service platform, it is equivalent to controlling the data processing device to provide the remaining processing capacity to the initial service object when the working state of the data processing device is in an unsaturated state, which may maximize the utilization of resources.

In some embodiments of the present application, each data processing unit includes at least one data processing chip. For example, the data processing chip can be a graphics processing unit (GPU), a central processing unit (CPU) and an application specific integrated circuit (ASIC) chip.

In some embodiments of the present application, the method 200 may further include:

monitoring an operating state of the each data processing unit; and according to the operating state, switching a data to be processed by any data processing unit to other data processing units if the any data processing unit is determined to be faulty.

In other words, the scheduling platform 130 may dynamically schedule the faultless data processing unit to share the data processing work of the faulty data processing unit by monitoring the operating state of the data processing unit in the data processing device.

A faultless data processing unit in the data processing device is used to undertake the data to be processed by the faulty data processing unit, that is, the faulty data processing unit is replaced with the faultless data processing unit to realize the data processing, which may not only ensure a timely processing of the data to be processed, but also ensure the stability of the data processing, and improve the processing efficiency and user experience of the data.

That is, the owner of the data processing device may take out a part of its own resources to replace the faulty data processing unit to process data for the service object.

In some embodiments of the present application, the method 200 may further include:

If the scheduling platform 130 schedules the faultless data processing unit to share the data processing work of the faulty data processing unit, and the above correspondence includes an identification of the data unit, the scheduling platform updates the correspondence.

For example, if the scheduling platform 130 schedules the faultless data processing unit to share the data processing work of the faulty data processing unit, and the above correspondence includes the information shown in Table 2, the scheduling platform updates the correspondence.

Specifically, each data processing unit in the at least one data processing unit may correspond to a service object. For example, the at least one data processing unit includes a data processing unit A serving a service object A and a data processing unit B serving a service object B, and when the scheduling platform 130 dynamically schedules the faultless data processing unit A to share the data processing work of the faulty data processing unit B in a service time period A, the service object corresponding to the service time period A it updated from the service object B to the service object A.

In some embodiments of the present application, in the process of the scheduling platform 130 determines that any data processing unit is faulty, the scheduling platform 130 may determine that the any data processing unit is faulty if a difference between a third data processing capacity and a fourth data processing capacity of any data processing unit is greater than or equal to a set threshold; where the third data processing capacity is a current data processing capacity of the any data processing unit; and the fourth data processing capacity is a maximum data processing capacity that the data processing unit may provide within the operating cycle.

Specifically, it is ensured that the sum of at least one data processing capacity provided by the at least one data unit (data processing capacity 1+data processing capacity 2+ . . . +data processing capacity n) does not exceed the maximum data processing capacity that the data processing device may provide in one operating cycle. When the data processing device is abnormal, causing the data processing capacity actually provided by the data processing device to be less than the sum of the at least one data processing capacity provided by the at least one data unit, the scheduling platform 130 determines the faulty data processing unit by monitoring the operation state of each data processing unit in the at least one data processing unit, and controls other data processing units to process the unprocessed data of the faulty data processing unit.

In other words, if the difference between the maximum data processing capacity that may be provided by the any data processing unit and the processing capacity actually provided within the operating cycle is greater than or equal to the set threshold value, the scheduling platform 130 may determine that the any data processing unit is faulty. Optionally, the set threshold value may be a specific value or a value selected from a set, which is not specifically limited in the present application.

For example, the scheduling platform 130 may periodically monitor the data processing capacity actually provided by each data processing unit in the data processing device within one operating cycle, and by comparing whether the difference between the data processing capacity actually provided by each processing unit within one operating cycle and the maximum data processing capacity that the same data processing unit may provide within one operating cycle is within 1%, if it is within 1%, the correspondence may be maintained, and if it exceeds 1%, the correspondence may be updated.

Next, taking the data processing system 100 is a virtual currency mining system as an example, the aforementioned methods (hereinafter referred to as the hashrate providing method) is introduced in detail:

where the data processing unit may be a mining machine, the service platform may be a mining pool, the service object may be a user, the data processing capacity may be a hashrate, and the scheduling platform 130 may specifically be a hashrate scheduling platform.

Figure 3:
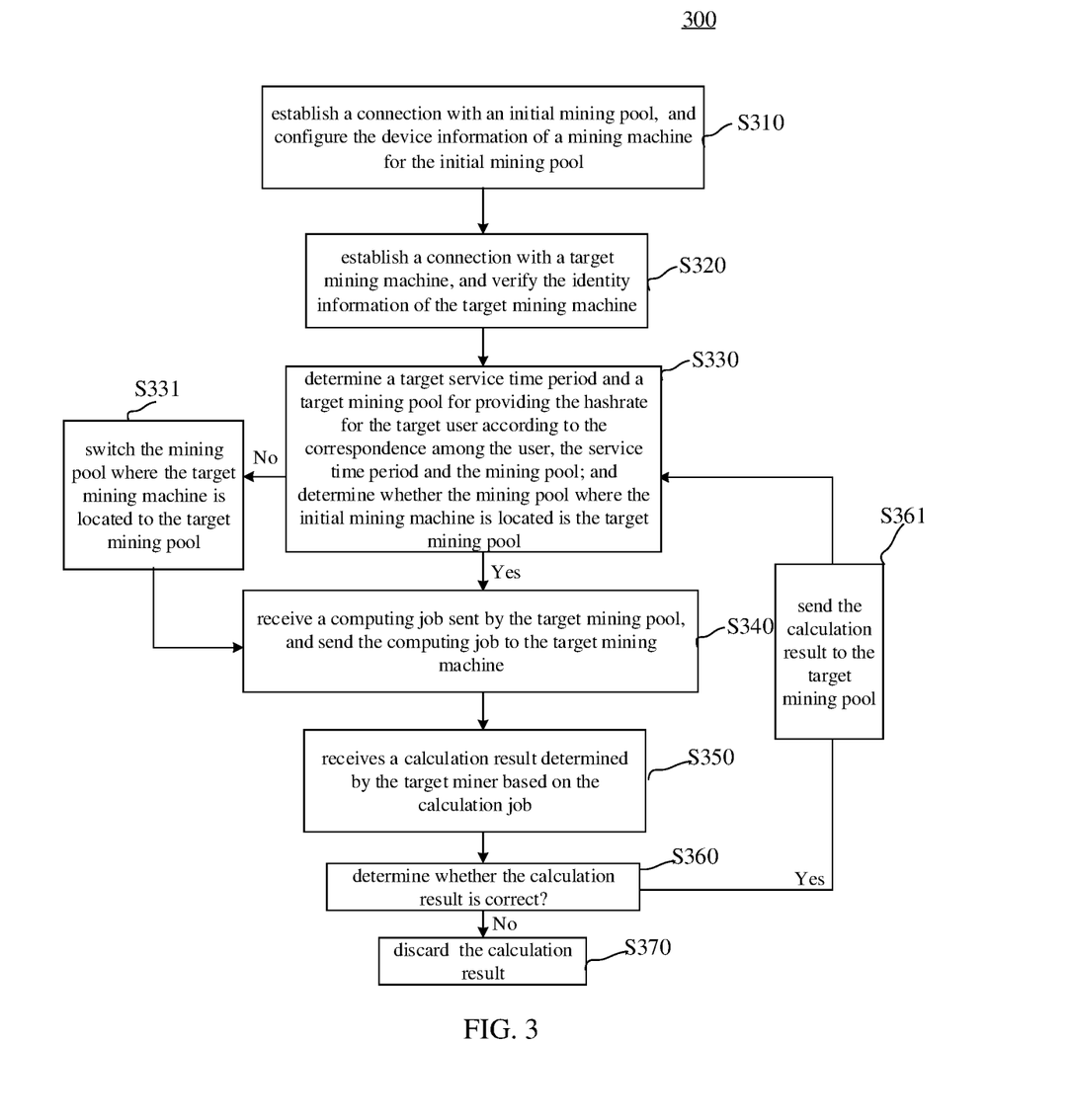

FIG. 3 is a flow chart of a hashrate providing method 300 according to an embodiment of the present application.

As shown in FIG. 3, the method 300 may include:

S310, the hashrate scheduling platform establishes a connection with the initial mining pool, and configures the device information of the mining machine for the initial mining pool.

Specifically, the hashrate scheduling platform configures the initial mining pool with the device information of the mining machine that needs to provide hashrate on the initial mining pool. Optionally, the initial mining pool may include at least one mining pool. Optionally, the device information of the mining machine includes user information of the mining machine or number information of the mining machine. If the above data processing device includes a plurality of mining machines, the mining machine that needs to provide the hashrate on the initial mining pool may be some or all of the mining machines of the plurality of mining machines.

S320, the hashrate scheduling platform establishes a connection with a target mining machine, and verifies the identity information of the target mining machine. Optionally, the identity information may include account information and secret key information of the target mining machine.

S330, the hashrate scheduling platform determines a target service time period and a target mining pool for providing the hashrate for the target user according to the correspondence among the user, the service time period and the mining pool; and determines whether the mining pool where the initial mining machine is located is the target mining pool.

Specifically, the hashrate scheduling platform determines the user who purchases the target mining machine as the target user, and then may determine the target service time period corresponding to the target mining machine and the target mining pool corresponding to the target mining machine based on the correspondence, and then the hashrate scheduling platform determines whether the mining pool where the target mining machine is located (that is, the currently connected mining pool) is the target mining pool.

S331, the hashrate scheduling platform switches the mining pool where the target mining machine is located to the target mining pool.

Specifically, if the hashrate scheduling platform determines that the mining pool where the target mining machine is located is not the target mining pool, the hashrate scheduling platform controls the target mining machine to switch to the target mining pool, that is, the hashrate scheduling platform controls the target mining machine to connect to the target mining pool, so that the target mining machine may provide hashrate for the target user in the target mining pool.

S340, the hashrate scheduling platform receives a computing job sent by the target mining pool, and sends the computing job to the target mining machine.

Specifically, the hashrate scheduling platform receives a virtual currency mining job issued by the target mining pool, and immediately forwards the virtual currency mining job to the target mining machine, so that the target mining machine may perform hashrate calculate. For example, the virtual currency mining job may be a mathematical problem that is difficult to calculate but the calculation result is easy to be verified. For example, the virtual currency mining job may be a job of calculating a hash value based on transaction record information within a time period A and a digital credential before the time period A.

S350, the hashrate scheduling platform receives a calculation result determined by the target mining machine based on the calculation job. Optionally, the calculation result may also be referred to as a share calculation result.

S360, the hashrate scheduling platform determines whether the calculation result is correct?

Specifically, the hashrate scheduling platform may broadcast the calculation result to mining machine other than the target mining machine through the target mining pool. If the calculation result passes the verification of a certain number of mining machines, and the target mining machine is the first mining machine to obtain the calculation result among all mining machines, it is determined that the calculation result is correct, otherwise it is determined that the calculation result is incorrect. Of course, the target mining machine may also broadcast the calculation result to other mining machines by itself, and report a verification result to the hashrate scheduling platform.

S370, if the calculation result is incorrect, the hashrate scheduling platform discards the calculation result.

S361, if the calculation result is correct, the hashrate scheduling platform sends the calculation result to the target mining pool.

In short, the hashrate scheduling platform is connected to the initial mining pool and the target mining machine, and completes the configuration of the initial mining pool and the identity verification of the target mining machine. Then, after the hashrate scheduling platform determines that the mining pool where the target mining machine is located is the target mining pool determined based on the correspondence among the user, the service time period and the mining pool, it receives the computing job issued by the target mining pool and forwards it to the target mining machine. The target mining machine obtains the calculation result through calculation and reports it to the hashrate scheduling platform, so that the hashrate scheduling platform may verify the correctness of the calculation result. If the calculation result is correct, the calculation result is reported to the target mining pool, and if the calculation result is invalid, the calculation result is discarded, and so repeatedly.

It should be noted that when the target mining machine reports the calculation result to the hashrate scheduling platform, it may also report the corresponding difficulty (Diff) of the calculation result to the hashrate scheduling platform, so that the hashrate scheduling platform may calculate the maximum hashrate or contribution of the target mining machine through the calculation result and the corresponding difficulty (Diff) of the calculation result.

Assuming that one operating cycle of the target mining machine is 10 minutes, it is measured that a maximum hashrate that the target mining machine may provide is 14 TH/s. The hashrate scheduling platform will maintain a separate correspondence for the target mining machine (for example, a correspondence list). Assuming that the mining pool corresponding to a user 1 is a mining pool 1, and the hashrate required by the user 1 is 1 TH/s, it is calculated that a service time period 1 corresponding to the user 1 is 42 seconds within an operating cycle of 10 minutes. In other words, the target mining machine needs to submit 42 seconds of hashrate to the user 1 of the mining pool 1. By analogy, the mining pool and the service time period corresponding to each user served by each mining machine may be established by calculation.

In the current service time period, after the mining machine has completed the hashrate work for the current user based on the current mining pool, the hashrate scheduling platform may control the mining machine to switch and connect to the mining pool corresponding to the next service time period according to the correspondence, and so repeatedly.

The example of the data processing method provided in the present application is described in detail above. It may be understood that, in order to realize the above function, the scheduling platform 130 includes a corresponding hardware structure and/or software module for executing each function. Those skilled in the art should easily realize that in combination with units and algorithm steps of the examples described in the embodiments disclosed herein, the present application may be implemented by hardware or a combination of the hardware and computer software. Whether a function is performed by the hardware or a method of the computer software driving hardware depends on a particular application of the technical solution and a designed constraint condition. Those skilled in the art may use different methods to implement the described functions for every particular application, but it should not be considered that such implementation goes beyond the scope of the present application.

For example, the scheduling platform 130 may be divided into functional units according to the above method examples, for example, each function may be divided into each functional unit, or two or more than two functions may be integrated into one processing unit. The above integrated unit may be implemented in a form of hardware, or also may be implemented in a form of a software functional unit. It should be noted that the unit division in the present application is exemplary, and is merely a logical function division and may have other division methods in actual implementation.

Figure 4:
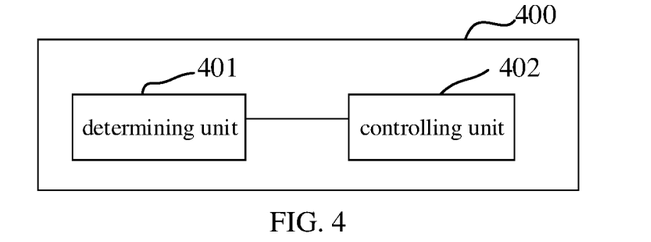
FIG. 4 and FIG. 5 are schematic block diagrams of a data processing apparatus according to an embodiment of the present application.

FIG. 4 is a schematic block diagram of a data processing apparatus 400 according to an embodiment of the present application. A hardware entity of the data processing apparatus 400 may be the scheduling platform 130 mentioned above.

As shown in FIG. 4, the data processing apparatus 400 may include:

a determining unit 401, the determining unit 401 being configured to:

determine a target service object;

according to a correspondence among a service object, a service time period and a service platform, determine a target service time period and a target service platform for providing a data processing for the target service object; and a controlling unit 402, being configured to control a data processing device to perform the data processing for the target service object within the target service time period and on the basis of the target service platform.

It should be noted that the determining unit 401 or the controlling unit 402 is a core module of the data processing apparatus 400, which may be a software module, for example, a module formed by a kernel code; or a hardware module, such as a logic circuit; and it may also be a module combining a software and a hardware. The present application does not limit the specific form of the processing module.

When the determining unit 401 or the controlling unit 402 is the software module, it may be compiled into a system driver integrated in an operating system (OS), and operate with the starting of the OS. The determining unit 401 or the controlling unit 402 may be compatible with different hardware. The above hardware includes, but is not limited to, CPU, GPU, and field programmable gate array (FPGA).

In some embodiments of the present application, the determining unit 401 is further configured to:

establish the correspondence according to the following methods:

determining the service platform corresponding to each service object in at least one service object;

determining the service time period corresponding to the each service object; and establishing the correspondence according to the service platform corresponding to the each service object and the service time period corresponding to the each service object.

In some embodiments of the present application, the determining unit 401 is specifically configured to:

determine a first data processing capacity required by the each service object;

determine a second data processing capacity that the data processing device may provide within one operating cycle; and determine the service time period corresponding to the each service object according to the first data processing capacity, the second data processing capacity and the operating cycle.

In some embodiments of the present application, the determining unit 401 is more specifically configured to:

$$Ti=(Hi/H)*T; \text{ and}$$

where the Ti represents the service time period corresponding to an $i^{th}$ service object in the at least one service object, the Hi represents the first data processing capacity required by the $i^{th}$ service object, the H represents the second data processing capacity, and the T represents the operating cycle.

In some embodiments of the present application, the determining unit 401 is more specifically configured to:

determine an average data processing capacity of the data processing device within a historical time period; and the average data processing capacity is used as the second data processing capacity.

In some embodiments of the present application, the controlling unit 402 is further configured to:

if it is determined that a sum of the service time periods corresponding to the at least one service object is less than or equal to the operating cycle, the data processing device will be controlled to perform the data processing for an initial service object within a remaining time period and on the basis of an initial service platform; and where the remaining time period is a time period other than the service time period corresponding to all service objects subtracted in the operating cycle.

In some embodiments of the present application, the data processing device includes at least one data processing unit, and each data processing unit includes at least one data processing chip. For example, the data processing chip can be a GPU, a CPU, and an ASIC chip.

In some embodiments of the present application, the processing unit is further configured to:

monitor an operating state of the each data processing unit; and according to the operating state, switch a data to be processed by any data processing unit to other data processing units if the any data processing unit is determined to be faulty.

In some embodiments of the present application, the processing unit is specifically configured to:

determine that the any data processing unit is faulty if a difference value between a third data processing capacity and a fourth data processing capacity of the any data processing unit is greater than or equal to a set threshold value; where the third data processing capacity is a current data processing capacity of the any data processing unit; and the fourth data processing capacity is a maximum data processing capacity that the data processing unit may provide within the operating cycle.

In some embodiments of the present application, the service object is a user, the service platform is a proof-of-work hashrate collection platform, and the data processing unit in the data processing device is the proof-of-work computing device.

It should be noted that the data processing apparatus 400 executes the data processing method 200 as shown in FIG. 2, and the specific process and the beneficial effects generated may be referred to the relevant description in the method embodiment, which will not be repeated here.

Figure 5:
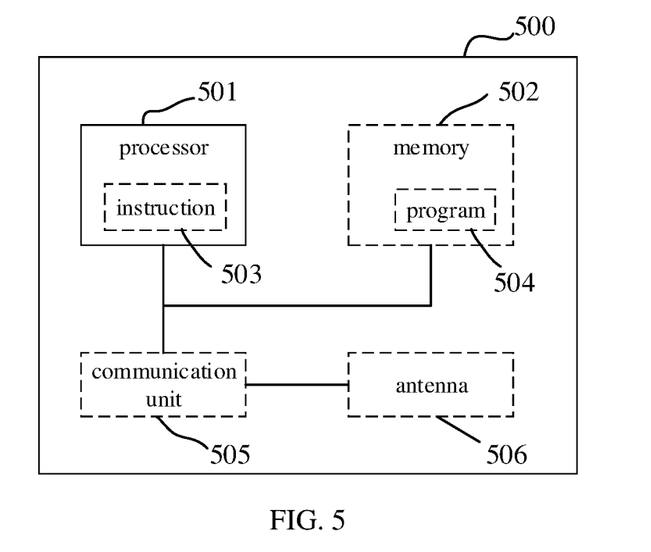

FIG. 5 is a schematic block diagram of an electronic device 500 according to an embodiment of the present application. Where the dotted line may be used to indicate that the unit (or module) is an optional unit (or module).

As shown in FIG. 5, the electronic device 500 may be used to implement the methods described in the above method embodiments. The electronic device 500 may be a terminal device or a server or a chip.

The electronic device 500 includes one or more processors 501, and the one or more processors 501 may support the electronic device 500 to implement the methods in the method embodiments corresponding to FIG. 2 to FIG. 3. The processor 501 may also be a general-purpose processor or a special-purpose processor. For example, the processor 501 may be a CPU. The CPU may be used to control the electronic device 500 to execute a software program, and then process data of the software program. The electronic device 500 may further include a transceiver 505 for realizing signal input (reception) and output (transmission).

For example, the electronic device 500 may be a chip, and the transceiver 505 may be an input and/or output circuit of the chip, or the transceiver 505 may be a communication interface of the chip, and the chip may serve as components of a terminal device or a server or other electronic devices.

For another example, the electronic device 500 may be a terminal device or a server, the transceiver 505 may be a transceiver of the terminal device or the server, or the transceiver 505 may be a transceiver circuit of the terminal device or the server.

The electronic device 500 may include one or more memories 502 on which a program 504 is stored, and the program 504 may be operated by the processor 501 to generate an instruction 503, so that the processor 501 executes the method described in the above method embodiments according to the instruction 503. Alternatively, data may also be stored in the memory 502. Optionally, the processor 501 may also read the data stored in the memory 502, and the data may be the above correspondence.

The processor 501 and the memory 502 may be provided separately or integrated together, for example, integrated on a single board of a server or a system on chip (SOC) of a terminal device.

The electronic device 500 may further include an antenna 506. The transceiver 505 is used to implement a transceiver function of the electronic device 500 through the antenna 506.

The specific manner in which the processor 501 executes the method of processing the proof-of-work calculation job may be refer to the relevant description in the method embodiment.

It should be understood that each step of the above method embodiments may be completed by using a logical circuit in a form of hardware in the processor 501 or an instruction in a form of software. The processor 501 may be a CPU, a digital signal processor (DSP), an application specific integrated circuit (ASIC), a field programmable gate array (FPGA) or other programmable logic devices, for example, a discrete gate, a transistor logic device, or a discrete hardware component.

Figure 6:
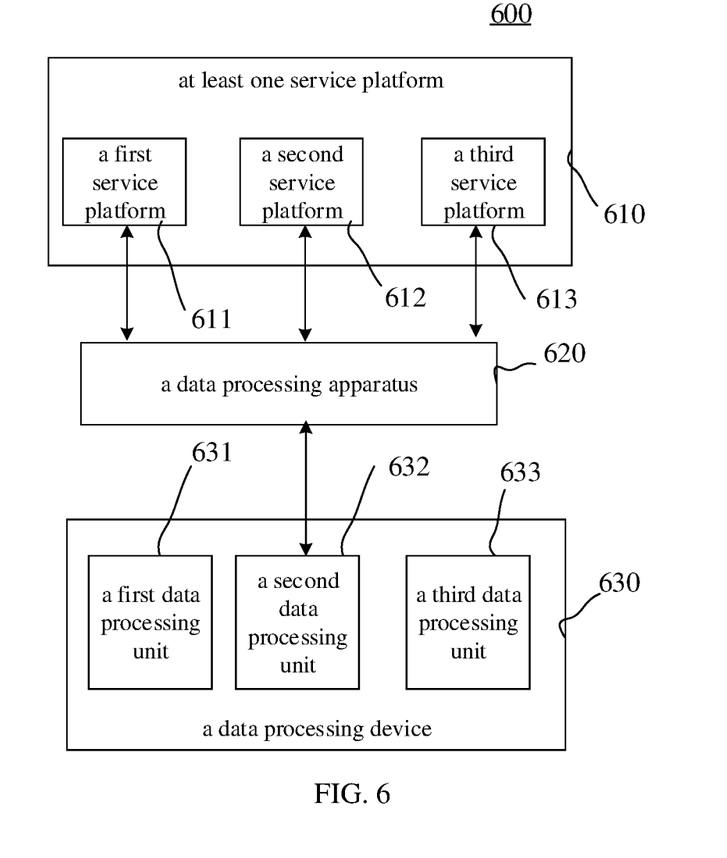
FIG. 6 is another schematic block diagram of a data processing system according to an embodiment of the present application.

FIG. 6 is a schematic block diagram of a data processing system 600 according to an embodiment of the present application.

As shown in FIG. 6, the data communication system 600 may include:

at least one service platform 610, a data processing apparatus 620 and a data processing device 630.

For example, the at least one service platform 610 may include a first service platform 611, a second service platform 612 and a third service platform 614. The data processing device 630 may include a first data processing unit 631, a second data processing unit 632 and a third data processing unit 633. The data processing apparatus 620 is configured to control each data processing unit in the data processing device 630 to perform the data processing on one or more service platforms in the at least one service platform 610.

Taking the second data processing unit 632 as an example, after the second data processing unit 632 is connected to the data processing apparatus 620, it provides processing capacity for the service object a (for example, an account a) during the service time period a within one operating cycle, and then automatically switch to provide processing capacity for the service object b (for example, an account b) during the service time period b, and finally the processing capacity output by the second data processing unit 632 is dynamically submitted to the plurality of service platforms in a time-sliced manner to provide processing capacity for the plurality of service objects. For example, the data processing apparatus 620 provides processing capacity for the service object a (such as the account a) during the service time period a within an operating cycle and on the basis of the first service platform 611, and then provides processing capacity for the service object b (such as the account b) during the service time period b and on the basis of the second service platform 612.

It should be noted that the data processing apparatus 620 may refer to the data processing apparatus 400 shown in FIG. 4 or the electronic device 500 shown in FIG. 5, and the service platform in the at least one service platform 610 may refer to the service platform 110 shown in FIG. 1, the data processing device 630 including at least one data processing unit may refer to the data processing device 120 shown in FIG. 1, and to avoid repetition, the related functions and structures thereof will not be repeated here.

In addition, the present application further provides a computer program product, and the method of implementing any method embodiment in the present application when the computer program is executed by the processor 601. Optionally, the computer program product may be stored in the memory 602, such as a program 604, and the program 604 is finally converted into an executable object file that may be executed by the processor 601 through processing processes such as preprocessing, compilation, assembly, and linking.

In addition, the present application further provides a computer readable storage medium storing a computer program thereon, and the method of implementing any method embodiment in the present application when the computer program is executed by the computer. The computer program may be a high-level language program or an executable object program.

By way of an example, and not limitation, the computer readable storage medium is, for example, a memory 602. The memory 602 may be a volatile memory or a nonvolatile memory, or the memory 602 may include both the volatile memory and the nonvolatile memory at the same time. Where the non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and used as an external cache. By way of example and not limitation, RAM of many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synch link dynamic random access memory (SLDRAM), and a direct Rambus random access memory (DR RAM).

It should be noted that, those skilled in the art may clearly understand that, for convenience and briefness of description, the specific working processes and the generated technical effects of the above described apparatus and device may refer to the corresponding processes and technical effects in the aforementioned method embodiments, which will not be repeated herein.

In the several embodiments provided in the present application, the disclosed system, apparatus, and method may be implemented in other manners. For example, some features of the method embodiments described above may be omitted, or not implemented. The above described apparatus embodiment is merely an example, the unit division is merely a logical function division and may be other division in actual implementation, and a plurality of units or components may be combined or integrated into another system. In addition, the coupling between each unit or between each component may be direct coupling or indirect coupling, and the above coupling includes electrical, mechanical or other forms of connection.

It should be understood that, in various embodiments of the present application, the size of the sequence number of each process does not mean the order of execution, and the order of execution of each process should be determined by its function and internal logic, and should not constitute any limitation to the implementation process of the embodiments of the present application.

In addition, the terms "system" and "network" are always used interchangeably herein. The term "and/or" herein is merely a description of the associated relationship of associated objects, which indicates that there may be three relationships. For example, A and/or B may indicate three situations: A exists alone, both A and B exist, and B exists alone. In addition, the character "/" herein generally indicates that the associated objects before and after the character are in an "or" relationship.

To sum up, the foregoing description is merely a preferred embodiment of the technical solution of the present application, rather than limiting the protection scope of the present application. Any modification, equivalent replacement, improvement, and the like made without departing from the spirit and principles of the present application shall fall within the protection scope of the present application.

What is claimed is:

1. A method for data processing comprising:
   determining a target service object;
   determining a target service time period and a target service platform for providing the target service object with data processing service according to a correspondence among service object, service time period and service platform; and
   controlling a data processing device to perform the data processing for the target service object within the target service time period and on the basis of the target service platform,
   wherein the method further comprises:
      determining the service platform corresponding to each service object in at least one service object;
      determining the service time period corresponding to the each service object; and
      establishing the correspondence according to the service platform corresponding to the each service object and the service time period corresponding to the each service object, and
   wherein determining the service time period corresponding to the each service object comprises:
      determining a first data processing capacity required by the each service object;
      determining a second data processing capacity that the data processing device may provide within one operating cycle; and
      determining the service time period corresponding to the each service object according to the first data processing capacity, the second data processing capacity and the operating cycle.

2. The method according to claim 1, wherein determining the service time period corresponding to the each service object according to the first data processing capacity, the second data processing capacity and the operating cycle comprises:
   determining the service time period corresponding to the each service object according to a following formula:

$Ti=(Hi/H)*T$; and wherein the Ti represents the service time period corresponding to the $i^{th}$ service object in the at least one service object, the Hi represents the first data processing capacity required by the $i^{th}$ service object, the H represents the second data processing capacity, and the T represents the operating cycle.

3. The method according to claim 1, wherein determining a second data processing capacity that the data processing device may provide within one operating cycle comprises:
   determining an average data processing capacity of the data processing device within a historical time period; and
   using the average data processing capacity as the second data processing capacity.

4. The method according to claim 1, wherein the method further comprises:
   if it is determined that a sum of the service time periods corresponding to the at least one service object is less than or equal to the operating cycle, the data processing device will be controlled to perform the data processing for the initial service object within a remaining time period and on the basis of the initial service platform; and wherein the remaining time period is the time period of the operation cycle minus the service time period corresponding to all service objects.

5. The method according to claim 1, wherein the data processing device comprises at least one data processing unit, and each data processing unit comprises at least one data processing chip.

6. The method according to claim 5, wherein the data processing chip can be a graphics processing unit (GPU), a central processing unit (CPU) or an application specific integrated circuit (ASIC) chip.

7. The method according to claim 5, wherein the method further comprises:
monitoring an operating state of the each data processing unit; and
switching data to be processed by any data processing unit to other data processing units if the any data processing unit is determined to be faulty according to the operating state.

8. The method according to claim 7, wherein the any data processing unit is determined to be faulty comprises:
determining that the any data processing unit is faulty if a difference value between a third data processing capacity and a fourth data processing capacity of the any data processing unit is greater than or equal to a set threshold value; wherein the third data processing capacity is a current data processing capacity of the any data processing unit;
and the fourth data processing capacity is a maximum data processing capacity that the data processing unit may provide within the operating cycle.

9. The method according to claim 1, wherein the service object is a user, the service platform is a proof-of-work hashrate collection platform, and the data processing unit in the data processing device is the proof-of-work computing device.

10. A data processing apparatus comprising:
a determining unit configured to:
determine a target service object; and
determine a target service time period and a target service platform for providing the target service object with data processing service according to a correspondence among service object, service time period and service platform; and
a controlling unit configured to control a data processing device to perform the data processing for the target service object within the target service time period and on the basis of the target service platform;
wherein the determining unit is further configured to:
determining the service platform corresponding to each service object in at least one service object;
determining the service time period corresponding to the each service object; and
establishing the correspondence according to the service platform corresponding to the each service object and the service time period corresponding to the each service object, and
wherein the determining unit is further configured to:
determine a first data processing capacity required by the each service object;
determine a second data processing capacity that the data processing device may provide within one operating cycle; and
determine the service time period corresponding to the each service object according to the first data processing capacity, the second data processing capacity and the operating cycle.

11. The data processing apparatus according to claim 10, wherein the determining unit is further configured to:
determine the service time period corresponding to the each service object according to the following formula:

$Ti=(Hi/H)*T$; and wherein the Ti represents the service time period corresponding to the $i^{th}$ service object in the at least one service object, the Hi represents the first data processing capacity required by the $i^{th}$ service object, the H represents the second data processing capacity, and the T represents the operating cycle.

12. The data processing apparatus according to claim 10, wherein the determining unit is further configured to:
determine an average data processing capacity of the data processing device within a historical time period; and
using the average data processing capacity as the second data processing capacity.

13. The data processing apparatus according to claim 10, wherein the controlling unit is further configured to:
if it is determined that a sum of the service time periods corresponding to the at least one service object is less than or equal to the operating cycle, the data processing device will be controlled to perform the data processing for the initial service object within a remaining time period and on the basis of the initial service platform; and wherein the remaining time period is the time period of the operation cycle minus the service time period corresponding to all service objects.

14. The data processing apparatus according to claim 10, wherein the data processing device comprises at least one data processing unit, and each data processing unit comprises at least one data processing chip.

15. An electronic device comprising:
a processor and a memory, the memory being configured to store a computer program, and the processor being configured to call and run the computer program stored in the memory to execute the method of claim 1.

16. A data processing system comprising:
a data processing device, a data processing apparatus and at least one service platform, the data processing device being connected to the at least one service platform through the data processing apparatus; and wherein the data processing apparatus is configured to control the data processing device to execute the method of claim 1.

* * * * *